(12) United States Patent
Pandey et al.

(10) Patent No.: US 12,170,604 B2
(45) Date of Patent: *Dec. 17, 2024

(54) NETWORK REPOSITORY FUNCTION OVERLOAD PROTECTION

(71) Applicant: Cisco Technology, Inc., San Jose, CA (US)

(72) Inventors: Sudeep Kumar Pandey, Acton, MA (US); Rohit Jain, Bothell, WA (US); Ravikant Matwar Prasad Singh, Sunnyvale, CA (US); Sujin Kumar Anagani, Morrisville, NC (US)

(73) Assignee: Cisco Technology, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/361,820

(22) Filed: Jul. 29, 2023

(65) Prior Publication Data

US 2024/0039823 A1 Feb. 1, 2024

Related U.S. Application Data

(63) Continuation of application No. 17/826,657, filed on May 27, 2022, now Pat. No. 11,765,064.

(51) Int. Cl.
*H04L 43/16* (2022.01)
*H04L 43/0817* (2022.01)
*H04L 43/0882* (2022.01)
*H04L 43/10* (2022.01)
*H04L 47/125* (2022.01)

(52) U.S. Cl.
CPC .......... *H04L 43/16* (2013.01); *H04L 43/0817* (2013.01); *H04L 43/0882* (2013.01); *H04L 43/10* (2013.01); *H04L 47/125* (2013.01)

(58) Field of Classification Search
CPC . H04L 43/16; H04L 43/0817; H04L 43/0882; H04L 43/10; H04L 43/20; H04L 47/125
See application file for complete search history.

(56) References Cited

U.S. PATENT DOCUMENTS

| | | | |
|---|---|---|---|
| 2020/0137663 A1* | 4/2020 | Albasheir | H04W 28/08 |
| 2020/0267214 A1* | 8/2020 | Yang | H04L 67/1036 |
| 2020/0314672 A1* | 10/2020 | Farooq | H04L 43/0817 |
| 2021/0068045 A1* | 3/2021 | Regnault | H04L 43/10 |

(Continued)

FOREIGN PATENT DOCUMENTS

| | | | |
|---|---|---|---|
| CN | 109413667 A | * | 3/2019 |
| CN | 110505318 A | * | 11/2019 |

(Continued)

OTHER PUBLICATIONS

"Heartbeat." (Year: 2024).*

(Continued)

*Primary Examiner* — Alina A Boutah
(74) *Attorney, Agent, or Firm* — Merchant & Gould P.C.

(57) ABSTRACT

Providing overload protection may include receiving, from a first NRF of two or more NRFs, a load metric and comparing the load metric to a threshold. Additionally, when the load metric is above the threshold, providing NRF overload protection may include sending a Network Function (NF) Discovery (NFD) message to a second NRF instead of the first NRF and sending a heartbeat signal to the first NRF.

20 Claims, 10 Drawing Sheets

(56) References Cited

U.S. PATENT DOCUMENTS

| | | | |
|---|---|---|---|
| 2021/0219179 A1 | 7/2021 | Narath et al. | |
| 2021/0258864 A1* | 8/2021 | Jeong | H04L 41/08 |
| 2021/0297935 A1* | 9/2021 | Belling | H04L 45/00 |
| 2021/0392197 A1* | 12/2021 | Yang | H04L 67/306 |
| 2022/0014939 A1* | 1/2022 | Colom Ikuno | H04W 8/12 |
| 2022/0015023 A1* | 1/2022 | De-Gregorio-Rodriguez | H04L 67/02 |
| 2022/0060547 A1* | 2/2022 | Krishan | H04L 67/51 |
| 2022/0103435 A1* | 3/2022 | Tian | H04L 43/06 |
| 2022/0131945 A1* | 4/2022 | Sapra | H04L 47/12 |
| 2022/0191294 A1* | 6/2022 | Yang | H04L 67/30 |
| 2022/0322065 A1* | 10/2022 | Shekhar | H04W 24/08 |
| 2022/0346188 A1* | 10/2022 | Malhotra | H04L 67/51 |
| 2022/0360991 A1* | 11/2022 | Rajput | H04L 63/1483 |
| 2022/0386225 A1* | 12/2022 | Sapra | H04W 84/042 |
| 2023/0179481 A1* | 6/2023 | Krishan | H04L 67/51 709/223 |
| 2023/0180056 A1* | 6/2023 | Krishan | H04W 28/088 370/230 |

FOREIGN PATENT DOCUMENTS

| | | | | |
|---|---|---|---|---|
| CN | 111417151 B | * | 10/2021 | H04L 41/0663 |
| CN | 111343705 B | * | 3/2022 | H04W 52/0203 |
| CN | 114363935 A | * | 4/2022 | |
| WO | WO-2020031158 A1 | * | 2/2020 | |
| WO | WO-2020069825 A1 | * | 4/2020 | H04L 41/06 |
| WO | 2021047551 A1 | | 3/2021 | |
| WO | WO-2021104636 A1 | * | 6/2021 | H04L 41/0806 |
| WO | WO-2021160774 A1 | * | 8/2021 | |
| WO | 2021197773 A1 | | 10/2021 | |
| WO | WO-2022066078 A1 | * | 3/2022 | |
| WO | WO-2022179713 A1 | * | 9/2022 | H04L 41/40 |

OTHER PUBLICATIONS

5G; 5G System; Network function repository services; Stage 3; ETSI TS 129 510 V15.3.0, Technical Specification, (3GPP TS 29.510 version 15.3.0 Release 15) (Year: 2019).*

Shekhar, Ravi; Ghosh, Ameo; and Bhate, Shantanu, "System and Method for Detecting Infinite Signaling Loop in Hierarchical NRF Deployments", Technical Disclosure Commons, (Aug. 17, 2020) https://www.tdcommons.org/dpubs_series/3528 (6 Pages).

Shekhar, Ravi; Seth, Satyabrata; Bhate, Shantanu; and Ghosh, Ameo, "Techniques to Facilitate Selection of Next HOP NRF in a Hierarchical Network Repository Function (NRF) Deployment in 5G Networks", Technical Disclosure Commons, (Mar. 12, 2021) https://www.tdcommons.org/dpubs_series/4148 (8 pages).

* cited by examiner

| Attribute | Message | NF-Service | Interface | Values |
|---|---|---|---|---|
| Load-metric | NFUpdate/PATCH (Hearbeat response) | Nnrf_Management, Nnrf_Discovery | Nnrf_interface | 0-100 |
| ExtendedValidityTime | NFDiscovery/GET (Discovery response) | Nnrf_Management, Nnrf_Discovery | Nnrf_interface | 0-3600 |
| ⋮ | | | | |

NETWORK REPOSITORY FUNCTION OVERLOAD PROTECTION

RELATED APPLICATION

This application is a continuation of and claims priority to U.S. patent application Ser. No. 17/826,657 filed May 27, 2022, the disclosure of which is incorporated herein by reference in its entirety.

TECHNICAL FIELD

The present disclosure relates generally to overload protection for Network Repository Function (NRFs).

BACKGROUND

Networking architectures have grown increasingly complex in communications environments, particularly mobile networking environments. Mobile communication networks have grown substantially in subscriber base as end users become increasingly connected to mobile network environments. As the number of mobile subscribers increases, efficient management of communication resources becomes more critical. In particular, there are significant challenges related to providing 3rd Generation Partnership Project (3GPP) accesses efficiently.

An example mobile communication network may comprise a Fifth Generation (5G) network. 5G networks are cellular networks, in which the service area is divided into small geographical areas called cells. 5G wireless devices in a cell communicate by radio waves with a cellular base station via fixed antennas, over frequency channels assigned by the base station. The base stations, termed gNodeBs (gNB), are connected to switching centers in the telephone network and routers for Internet access by high-bandwidth optical fiber or wireless backhaul connections. As in other cellular networks, a mobile device moving from one cell to another is automatically handed off seamlessly to the current cell. 5G may support up to a million devices per square kilometer, for example, while Fourth Generation (4G) may support only one-tenth of that capacity.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Providing overload protection may include receiving, from a first NRF of two or more NRFs, a load metric and comparing the load metric to a threshold. Additionally, when the load metric is above the threshold, providing NRF overload protection may include sending a Network Function (NF) Discovery (NFD) message to a second NRF instead of the first NRF and sending a heartbeat signal to the first NRF.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

NRFs may comprise one of the functions of the 3rd Generation Partnership Project (3GPP) Service Based Architecture for Fifth Generation (5G) Core networks. The NRFs may act as central Services Discover brokers for NFs in the 5G core. NRFs may have high loads or otherwise become overloaded, resulting in the NRF functioning inefficiently, ineffectively, and/or not at all. NFs may continuously probe an NRF, particularly if an NF has an associated priority to use the NRF. This probing may cause the NRF to have an even higher load and/or prevent the NRF from reducing the load from an overloaded condition. The NRF may respond to probing with rejection and/or timeouts, causing further degradation at the NRF.

The NF may identify that an NRF is experiencing a high load by monitoring responses to heartbeat signals and/or discovery messages sent by the NF. The NF may send heartbeat signals to NRFs that the NF is registered with and discovery messages to any NRF. When the NF does not receive a response to the heartbeat signal from the NRF, the NF may determine that the NRF is overloaded and cannot respond to the heartbeat signal. The NF may then interface with a different NRF to prevent interfacing with the NRF experiencing the high load. Eventually, the NRF may recover while not receiving any new requests from the NF, and thereby reducing the load the NRF is experiencing to a threshold just below the overload state. The NRF may begin to respond to the heartbeat signals sent by the NF immediately after the load moves below the threshold or while still overloaded but with enough capacity to send the response to the heartbeat signal. The NF may then interface with the NRF that is just below the high load threshold or still overloaded, and the interaction between the NF and the NRF may cause the NRF to move back over the threshold and again have a high load or keep the NRF in an overloaded state. Therefore, the NRF may be stuck in a cycle of having high load and continue to operate in an overload state. As used herein, an overloaded NRF may comprise an NRF that is operating inefficiently, ineffectively, and/or not at all due to the load the NRF is handling. Each NRF may have a defined threshold that may indicate whether the NRF is overloaded or not.

Embodiments of the disclosure may provide overload protection to NRFs by (i) providing to NFs information detailing whether NRFs are congested or not, (ii) enabling NRFs to reduce NF discovery signaling by using a validity time attribute that allows the NFs to extend the validity time of peers discovered by the NFs interfacing with NRFs, and (iii) implementing a backoff algorithm for NFs to determine when to resume attempting to interface with NRFs that are known to be overloaded. The NFs may use the information, validity time attribute, and backoff technique to determine which NRF to interface with, which signals that need to be sent, and when to begin interfacing with NRFs after overloading. Embodiments of the disclosure may allow NFs to dynamically perform NRF Service-based Interface (Nnrf) signaling load distribution for the NFs to determine whether an NRF is available or if interfacing with the NRF may overload the NRF. Nnrf may identify a Service-based Interface for NRFs.

Figure 1:
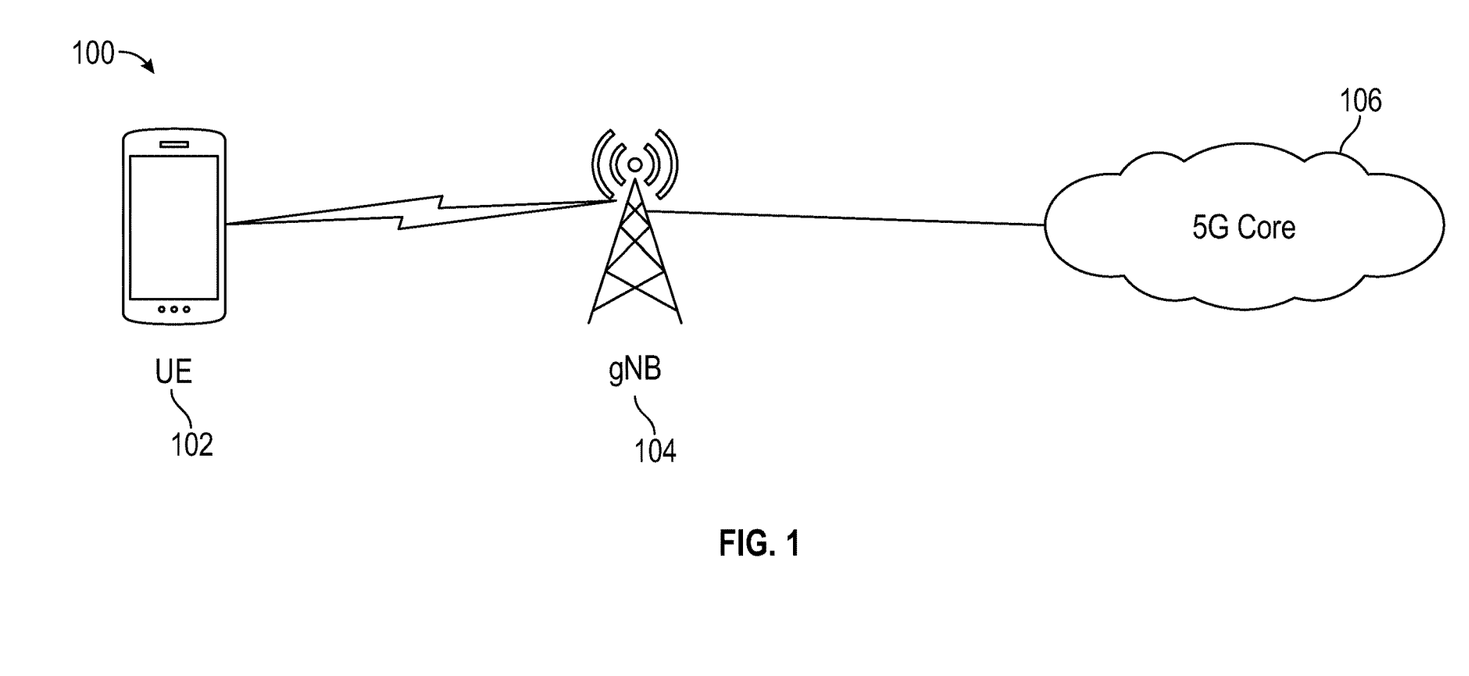
FIG. 1 is a block diagram of an operating environment of a Fifth Generation (5G) network.

FIG. 1 is a block diagram of an operating environment 100 of a Fifth Generation network. The operating environment 100 may include a user equipment (UE) 102, a gNodeB (gNB) 104, and a 5G core 106. While a single UE 102, gNB 104, and 5G core 106 are shown in the operating environment 100, any number of UEs 102, gNBs 104, and/or 5G cores 106 may be included in the operating environment 100.

The UE 102 may comprise any device associated with a user of the 5G network, such as a mobile phone, a tablet, a modem, and the like. The gNB 104 may comprise a base station of the 5G network that may receive and transmit communications between the UE 102 and the 5G core 106. The 5G core 106 may establish connectivity to the network for users and may provide access to services. In order to facilitate services, the 5G core 106 architecture may include a plurality of NFs (e.g., Application Function (AF), Access and Mobility Management Function (AMF), Session Management Function (SMF), Policy Control Function (PCF), User Plane Function (UPF), etc.). NRFs may act as a central Services Discovery broker for the NFs in the 5G core 106. For example, the NRFs may allow the NFs to register and discover other NFs.

Figure 2:
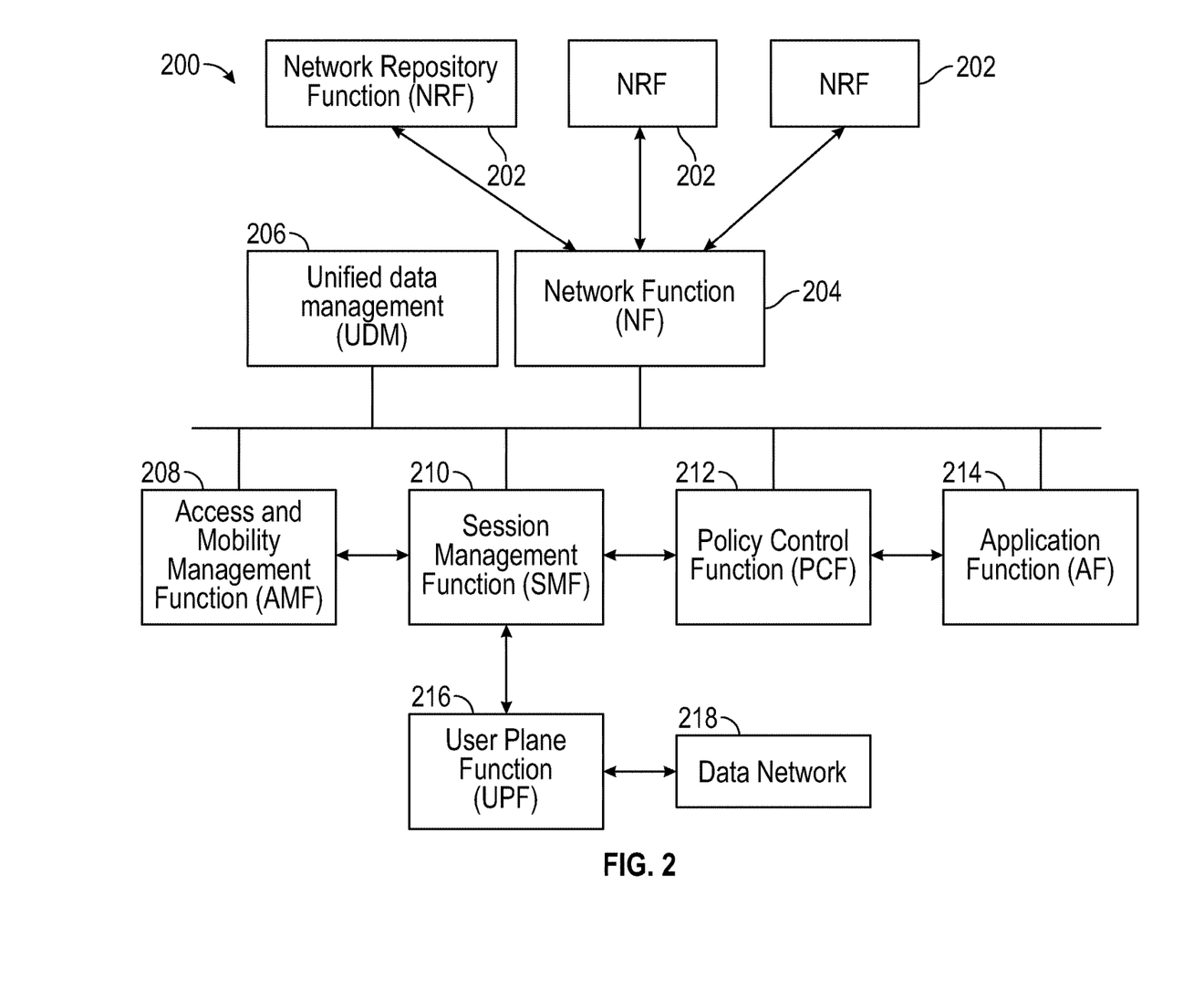
FIG. 2 is a block diagram of an operating environment for providing overload protection to Network Repository Functions.

FIG. 2 is a block diagram of an operating environment 200 for providing overload protection to NRFs 202. The operating environment 200 may include three NRFs 202, NFs 204, Unified Data Management (UDM) 206, AMF 208, SMF 210, PCF 212, AF 214, UPF 216, and data network 218. The NF 204 is an example NF, and the NF 204 may be any NF used in a 5G core, such as the 5G core 106 shown in FIG. 1. The AMF 208, SMF 210, PCF 212, AF 214, and UPF 216 are example NFs that may be included in a 5G core. Connections between the NRFs 202 and the NF 204 are shown for simplicity and clarity, but the AMF 208, SMF 210, PCF 212, AF 214, and UPF 216 may also interface with the NRFs 202. The operating environment 200 may include any number of NFs in other embodiments. The UDM 206 may store user data and profiles. The data network 218 may identify service provider services, internet access, and/or other services.

The NRFs 202 may compute a load metric based on the resource utilization of the specific NRF 202. The load metric may include a combination of metrics of the load experienced by the components of the NRFs (e.g., CPU). The load metric may indicate whether the NRF 202 may interface with an NF, such as NF 204, or whether the NRF 202 may overload when interfacing with an NF. The NRFs 202 may send the load metrics to NFs, such as NF 204, such as by sending the load metric in an Information Element (IE) using the Nnrf interface. The NRFs 202 may also reduce NF discovery signaling by using sending a validity time attribute to NFs that extends the validity time of peers discovered by the NFs interfacing with NRFs.

The NFs, NF 204, AMF 208, SMF 210, PCF 212, AF 214, and UPF 216, may use the received load metrics to balance the load between NRFs 202 to prevent overloading the NRFs 202. The NFs may also use the received validity time attribute to reduce messages sent to NRFs by extending the validity time of peers discovered by the NFs interfacing with NRFs according to the time defined by the received validity time attribute. Additionally, the NFs may use an algorithm to deregister from an NRF that is overloaded and prevent reregistering with the NRF too quickly, preventing the NF from sending the recovering NRF back into an overloaded state. These operations will be described in more detail herein with respect to FIG. 3A and FIG. 3B.

Figure 3A:
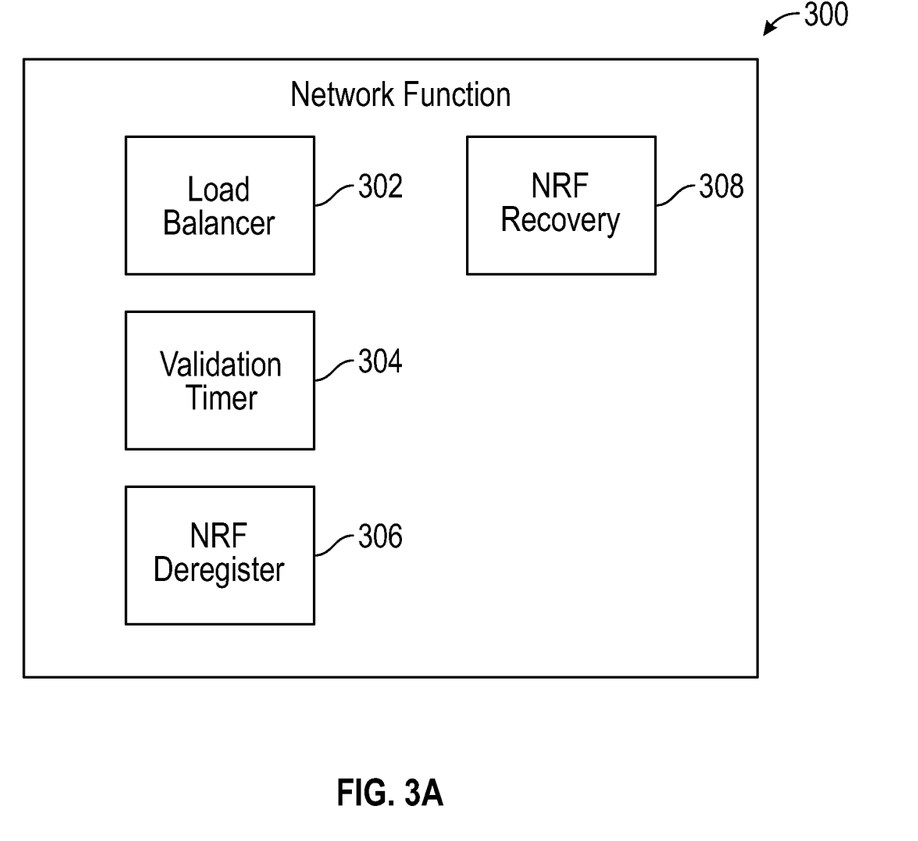
FIG. 3A is a block diagram of a Network Function.

FIG. 3A is a block diagram of an NF 300. The NF 300 may be any NF included in the 5G core, for example NF 204, AMF 208, SMF 210, PCF 212, AF 214, and UPF 216 shown in FIG. 2. In some embodiments, all of the NFs (NF 204, AMF 208, SMF 210, PCF 212, AF 214, and UPF 216) may have the components illustrated in FIG. 3. In other embodiments, not all NFs may have the components, and the NFs may interface with an NF that has the components to perform the overload protection methods described herein. The NF 300 may include a load balancer 302, a validation timer 304, an NRF deregister 306, and an NRF recovery 308.

As described above, the NF 300 may receive load metrics and validity time attributes that define a validity time for peers discovered by the NFs interfacing with NRFs. The NF 300 may receive the load metrics by receiving IEs that include the load metrics from the NRFs over Nnrf. The IEs may be sent to the NF 300 as a new message or inside any response message that is already being sent to the NF 300 (e.g., a response to a heartbeat signal sent by the NF 300, a response to a discovery request sent by the NF 300). The NF 300 may continue to receive updated load metrics in subsequent responses from NRFs so the NF 300 may have an up to date load metric to analyze.

The load balancer 302 may generate a weighted distribution using the load metrics and may use the generated weighted distribution to determine how to interface with one or more NRFs without causing the NRFs to become overloaded. For example, the NF 300 may proportionally distribute the Nnrf interface load between the NRFs based on the weighted distribution. The load balancer 302 may update the weighted distribution as the NF 300 receives updated load metrics.

When an NRF is overloaded and/or at another threshold before the overloading, the NRF may send a validity time attribute to the NF 300. The validation timer 304 may extend the validity times of all peers discovered through the NRF that sent the validity time attribute by the value defined by the received validity time attribute. The validity time may indicate that the information the NF 300 has regarding the peers discovered through the NRF that sent the validity time attribute are valid for the extended period of time defined by the validity time attribute. Therefore, the NF 300 may avoid sending discovery signals to the overloaded NRF during the extended period of time. This reduction of received discovery signals may allow the overloaded NRF to move below the threshold indicating that the NRF is overloaded and to begin functioning normally.

As stated above, the validity time attribute may be sent at a threshold before the NRF is overloaded. This threshold may be a point where the NRF expects to become overloaded or will become overloaded. Therefore, the validity time attribute may be used by the NF 300 to extend the validity time to assist in preventing in overloading the NRF because the NF 300 sends a reduced number of messages and helps to reduce the load of the NRF.

When an NRF is overloaded, the NRF may either send the NF 300 a message that indicates that the NRF load is above a threshold and/or will not respond to heartbeat signals sent by the NF 300. When the NF 300 determines that an NRF that the NF 300 wants to interface with is overload, the NRF deregister 306 may deregister with the overloaded NRF. The NF 300 may then attempt to register with another NRF. The registration process may be defined by a priority list associated with the NF 300. For example, the priority list indicates a group of NRF(s) with different priority levels. In this example, the NF 300 may attempt to register with the highest priority NRF that is not overloaded. Once the NF 300 is registered with another NRF, the NF 300 may interface with the newly registered NRF as the NF 300 intended to interface with the overloaded NRF. For example, the NF 300 may move all NF management traffic to the newly registered NRF.

When the NRF deregister 306 deregisters the NF 300 from the overloaded NRF, the NF 300 may send heartbeat signals to the overloaded NRF to determine when the NRF recovers from the overloaded state. When a response from the overloaded NRF to a heartbeat signal is received indicating that the NRF has recovered from the overloaded state, the NRF recovery 308 may execute a backoff algorithm to determine when to attempt to register with the recovered NRF. The backoff algorithm may generate a delay the NF 300 should wait before registering with the recovered NRF. This delay may prevent the NF 300 from registering with the recovered NRF and sending the NRF load back over the threshold into an overload state because the recovered NRF may being responding to the heartbeat signals immediately after the load is reduced below the threshold.

The backoff algorithm implemented by the NRF recovery 308 may be based on the load metric received in the recovered NRF's response to the heartbeat signal. The algorithm may generate the delay or otherwise trigger reregistration for the recovered NRF once the received load metric is lower than a registration threshold defined by the NRF recovery 308. In an example, the NRF recovery 308 may estimate the time the load metric will be below the registration threshold and may determine the delay based on this estimated time. In another example, instead of determining a delay, the backoff algorithm may continue to input the received load metrics from successive heartbeat signals to determine when the load metric is below the registration threshold and reregistration is therefore appropriate.

Therefore, the NF 300 may attempt to prevent NRFs from overloading using load balancing, via the load balancer 302. The NF may also attempt to alleviate issues with overloaded NRFs by reducing discovery messages sent to the overloaded NRFs and delaying reregistering with NRFs that recovered from an overload until the NRFs may handle interfacing without becoming overloaded again, via the validation timer 304, the NRF deregister 306, and the NRF recovery 308.

Figure 3B:
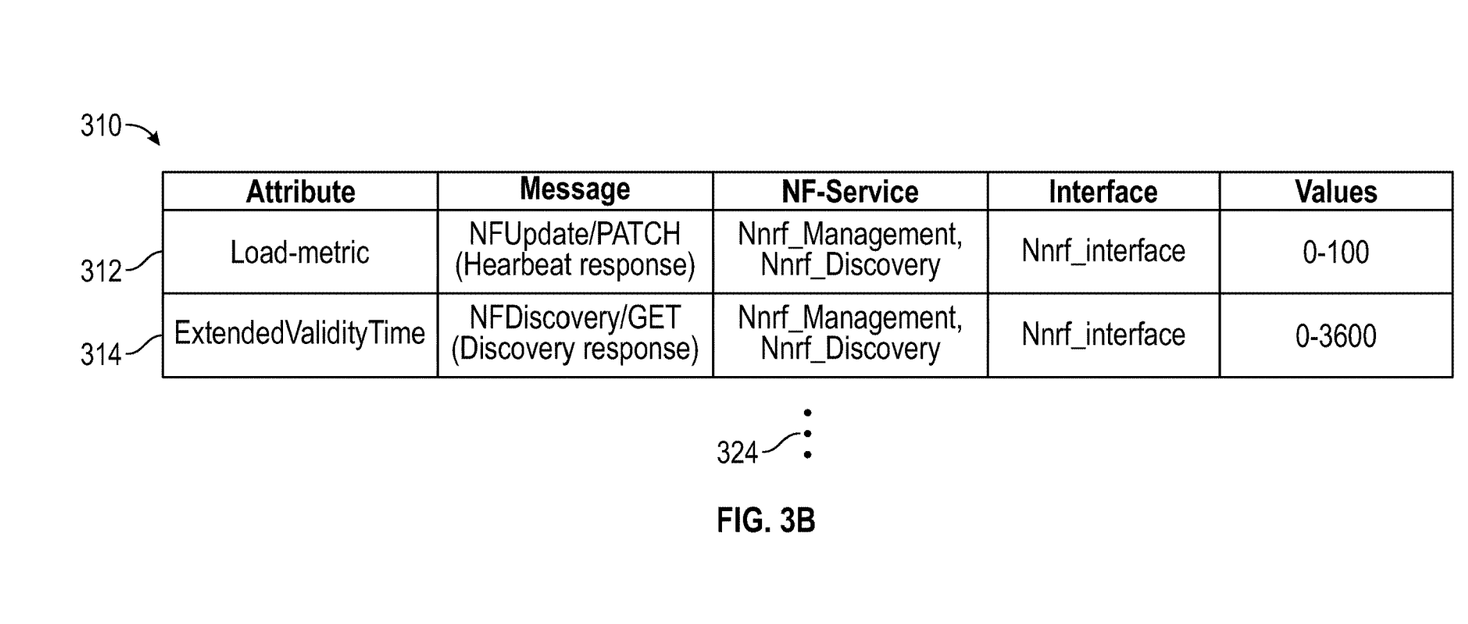
FIG. 3B is a chart illustrating the load metric and validity time attribute messaging between Network Repository Functions and Network Functions.

FIG. 3B is a chart 310 illustrating the load metric and validity time attribute messaging between Network Repository Functions and Network Functions. The chart 310 includes a load metric message 312 and a validity time attribute message 314. The chart may include additional messages as indicated by ellipses 324.

The load metric message 312 illustrates an example message from an NRF to an NF that indicates the NRFs current load. The load metric message 312 in this example may be sent in a response to a heartbeat signal sent by the NF, and the load metric may have a value from zero to one hundred with zero indicating no load and one hundred indicating a maximum load. The threshold defined for the NRF may be any number between zero and one hundred. For example, the NRF may begin degraded performance when the NRF has a load metric of seventy. Therefore, the threshold may be defined as seventy in this example. The NF may receive the threshold associated with the NRF when first registering with the NRF, when first interfacing with the NRF, and the like.

The validity time attribute message 314 in this example may be sent in a response to a discovery message from the NF, and the validity time attribute may have a value from zero to 3,600, with zero indicating the validity extension as zero seconds and 3,600 indicating the validity extension as 3,600 seconds. The value of the validity time attribute may be based on (i) the severity of the NRF's overloaded state and/or (ii) the result of previous overload states, including whether the value of the validity time attribute was large enough to enable the NRF to recover from the overloaded state.

Figure 4:
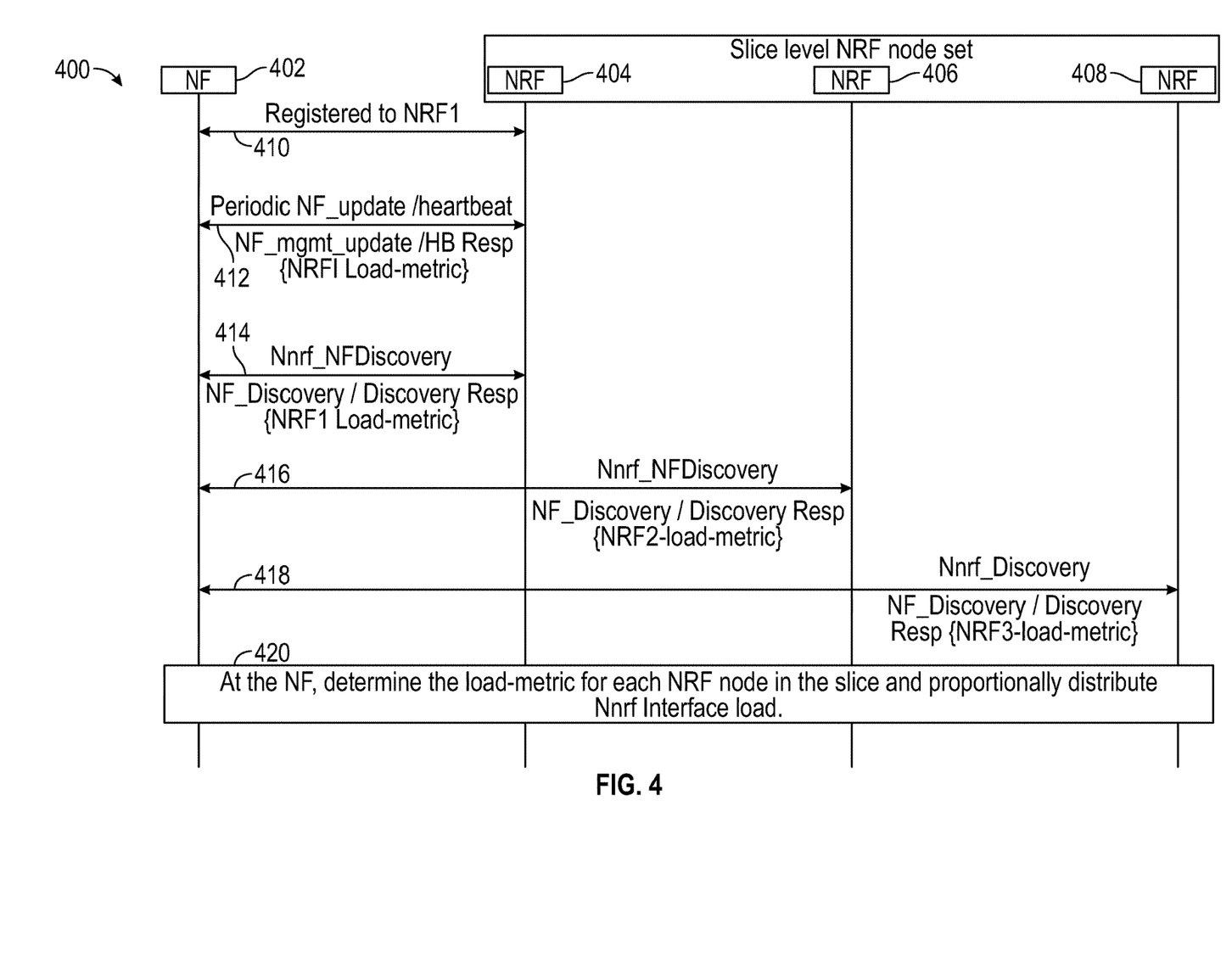
FIG. 4 is a signaling process between a Network Function and Network Repository Functions for receiving load metrics and determining load balancing.

FIG. 4 is a signaling process 400 between a Network Function and Network Repository Functions for receiving load metrics and determining load balancing. The signaling process 400 may begin with signal 410, and the NF 402 and the NRF 404 perform registration. Once the registration process is complete, signal 412 may include the NF 402 sending an initial heartbeat signal and subsequent heartbeat signals to the NRF 404 and the NRF 404 sending responses that include the load metric for the NRF 404. Each response by the NRF 404 may include an up to date load metric. The heartbeat signals may be sent by the NF 402 periodically, such as every minute, every fifteen minutes, every hour, etc. Signals 414, 416, and 418 may include the NF 402 sending discovery messages to the NRF 404, NRF 406, and NRF 408 respectively and receiving responses that include the load metric for the respective NRF. Therefore, the NF 402 may receive the load metric in responses to heartbeat signals and/or responses discovery messages. Heartbeat signals from the NF 402 to NRF 406 and NRF 408 are not shown in this example, but the NF 402 may send heartbeat signals to NRF 406 and NRF 408 in other examples.

Once the NF 402 receives load metrics for the NRF 404, NRF 406, and NRF 408, the NF may determine a load balance in operation 420 to prevent overloading NRF 404, NRF 406, and NRF 408. The load balance determination may be performed as described above with respect to FIG. 2, FIG. 3A, and FIG. 3B. For example, the load balancer 302 shown in FIG. 3A may determine the load balance.

Figure 5A:
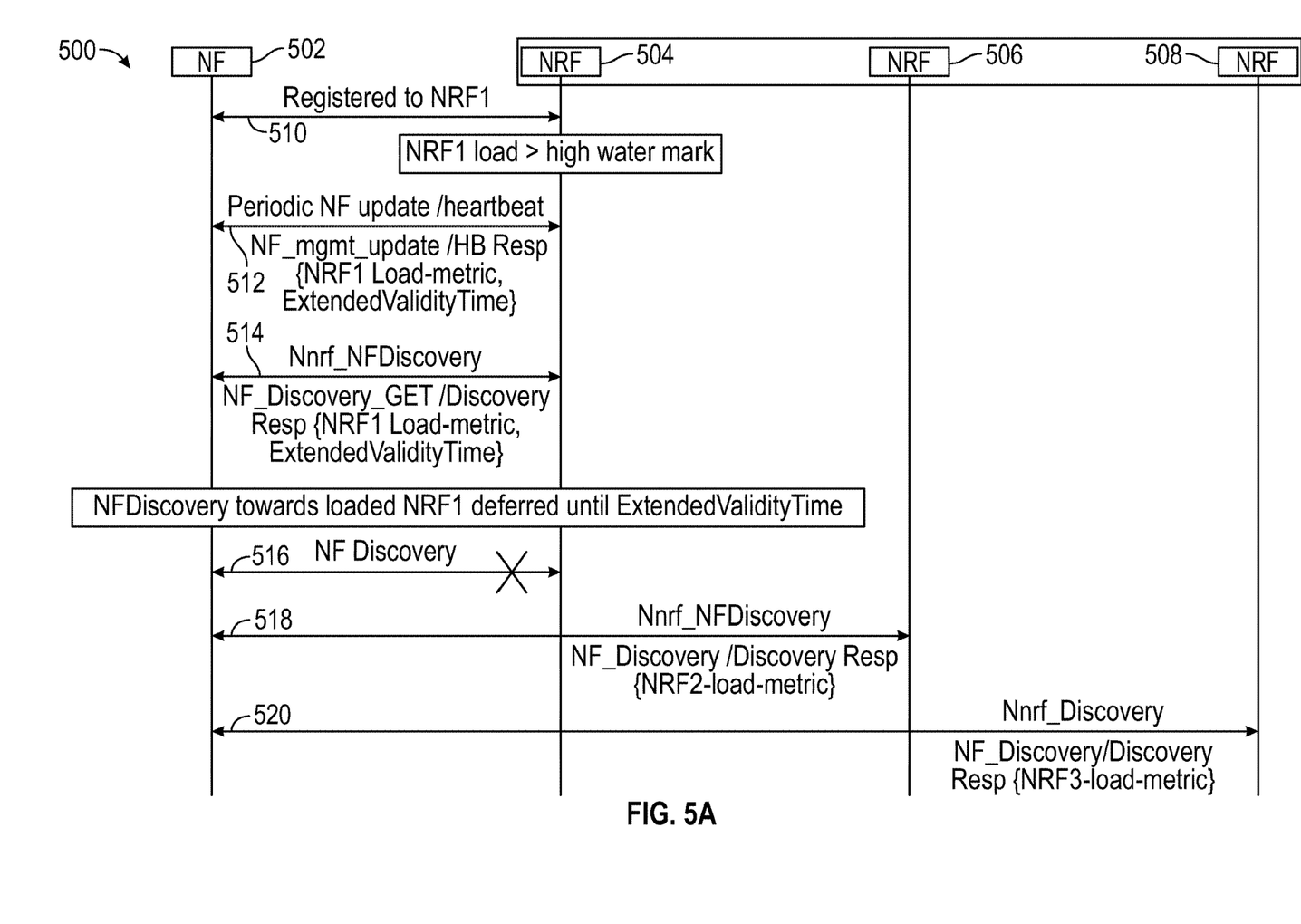
FIG. 5A is a signaling process between a Network Function and Network Repository Functions for performing overload protection for the Network Repository Functions.

FIG. 5A is a signaling process 500 between an NF 502 and NRF 504, NRF 506, and NRF 508 for performing overload protection for the NRFs. In this example, the NRF 504 may be overloaded. The signaling process may begin with signal 510, and the NF 502 and the NRF 504 may perform registration. Once the registration process is complete, signal 512 may include the NF 502 sending an initial heartbeat signal and subsequent heartbeat signals to the NRF 504. In this example, NRF 504 may be overloaded, so the NRF 504 may not respond to the heartbeat signals. If the NRF 504 does respond to the heartbeat signals, the NRF 504 may send a response that includes a validity time attribute and a time metric that may be above the threshold indicating the NRF 504 is overloaded. Signal 514 may include the NF 502 sending a discovery message to the NRF 504 and the NRF 504 sending response that may include a validity time attribute and a time metric that may be above the threshold indicating the NRF 504 is overloaded. Therefore, signal 516 may be delayed based on the validity time attribute the NF 502 receives. For example, the validation timer 304 shown in FIG. 3A may determine, using the validity time attribute, when the NF 502 should resume sending discovery messages to the NRF 504. Signals 518 and 520 may include the NF 502 sending discovery messages to the NRF 506, and NRF 508 respectively and receiving responses that include the load metric for the respective NRF.

Figure 5B:
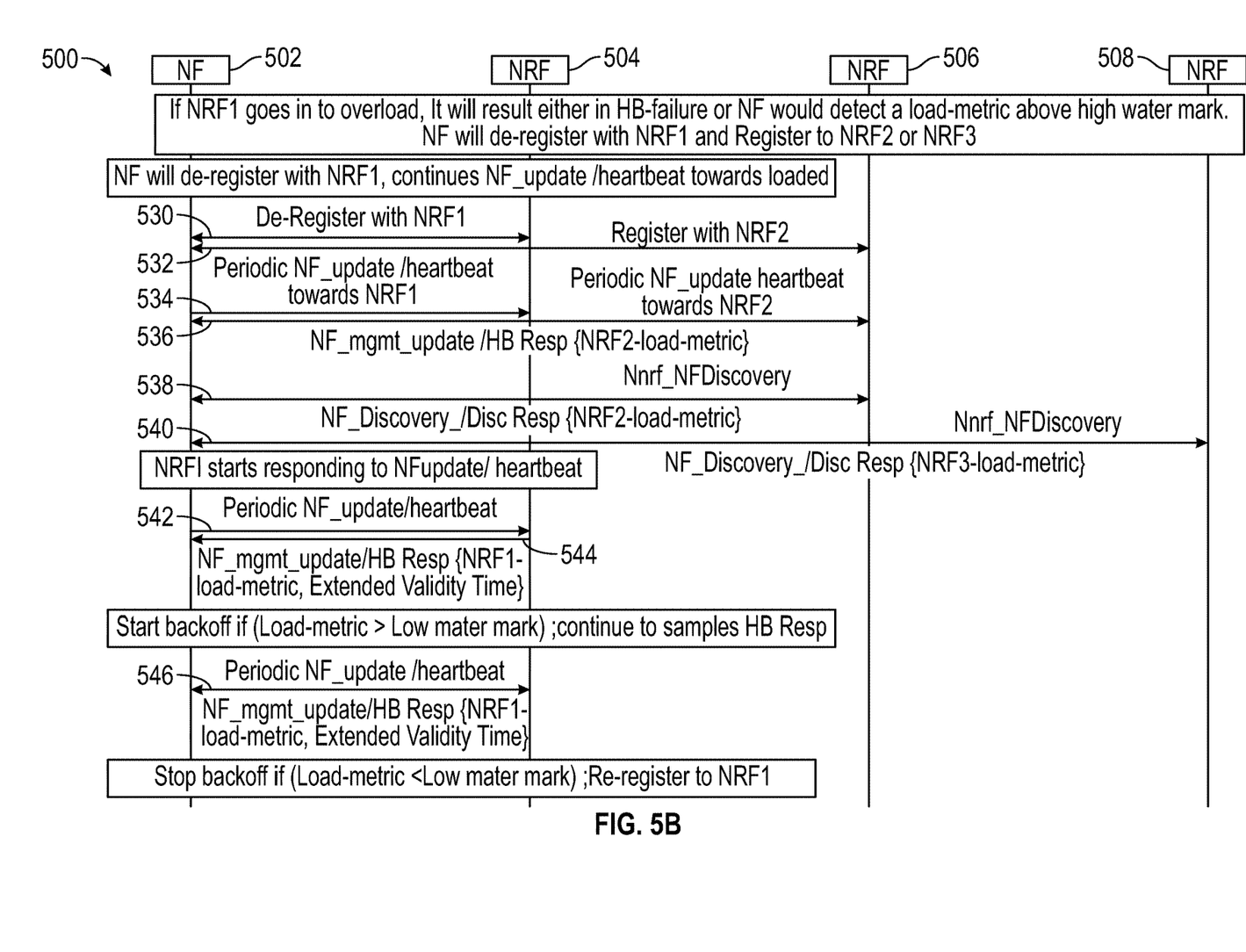
FIG. 5B is additional steps of the signaling process between the Network Function and the Network Repository Functions for performing overload protection for the Network Repository Functions shown in FIG. 5A.

FIG. 5B illustrates additional steps of the signaling process 500 between the Network Function and the Network Repository Functions for performing overload protection for the Network Repository Functions shown in FIG. 5A. Because the NRF 504 may be overloaded, the NF 502 may deregister with the NRF 504 in signal 530, such as via the NRF deregister 306 shown in FIG. 3A, and the NF 502 may attempt with register with the NRF 506 and/or the NRF 508. The NF 502 may determine which NRF to register with based on the received load metrics. In an example, the NF 502 may have the highest priority to interface with the NRF 504, the middle priority to interface with the NRF 506, and the lowest priority to interface with NRF 508. Therefore, the NF 502 may first attempt to register with NRF 506 before attempting to register with NRF 508. In this example, the NF 502 may determine to register with NRF 506, and the registration process may be performed in signal 532. Signal 534 may include the NF 502 sending periodic heartbeat signals to the NRF 504 to determine whether the NRF has recovered from overload. The NF 502 may interface with the NRF 506 and/or 508 while the NRF 504 is overloaded. Because the NF 502 is now registered with NRF 506, the NF 502 sends heartbeat signals and receives heartbeat responses from NRF 506 in signal 536. The NF 502 also sends discovery messages and receives discovery responses with included load metrics from the NRF 506 and NRF 508 in signals 538 and 540 respectively. Thus, the NF 502 does not send discovery messages to the NRF 504 while the NRF 504 is overloaded. The NF 502 may balance the load between the NRF 506, the NRF 508 and/or other NRFs based on the load metrics received in signals 536, 538, and/or 540.

Signal 544 includes the NRF 504 responding to the periodic heartbeat signals sent by the NF 502 in signal 542, indicating that the NRF 504 is no longer overloaded. The response to the heartbeat signal includes the current load metric and a validity time attribute. The validity time attribute may indicate to the NF 502 to extend the validity time again after the extension based on the first validity time attribute received in signal 514 shown in FIG. 5A. The validity time attribute may be sent because, while the NRF is no longer overloaded, the NRF may need the NF to send fewer discovery messages to avoid moving back into the overloaded state. The NF 502 will use the load metric received in signal 544 to determine when to reregister with the NRF 504, such as by NRF recovery 308 shown in FIG. 3A. In this example, the NF 502 determines not to reregister with the NRF 504 based on the load metric received in signal 544. The NRF 504 may continue to respond to heartbeat signals, such as the response in signal 546. The NF 502 may determine to reregister with NRF 504 based on the new load metric included in signal 546.

Figure 6:
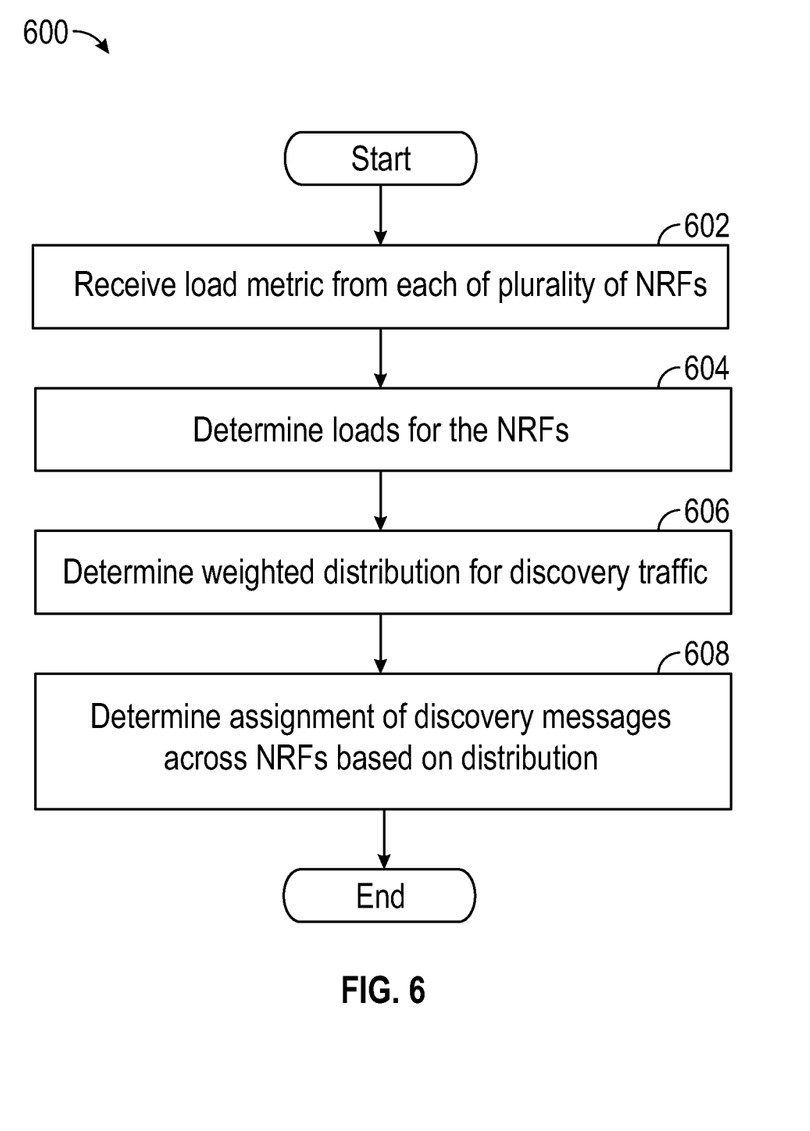
FIG. 6 is a flow chart of a method for a Network Function to load balance across Network Repository Functions.

FIG. 6 is a flow chart of a method 600 for an NF to load balance across NRFs. Method 600 begins at operation 602, and load metrics may be received from each of a plurality of NRFs. For example, the load metrics may be received in responses to heartbeat signals and/or discovery messages sent to the NRFs.

In operation 604, the load for the NRFs may be determined, for example, using the load metrics. Each load metric may be a value from zero to one that indicates the load of the respective NRF. In operation 606, a weighted distribution for discovery traffic is determined, for example based on the loads of the NRFs. In operation 608, the assignment of discovery messages across the NRFs is determined based on the distribution determined in operation 606.

Figure 7:
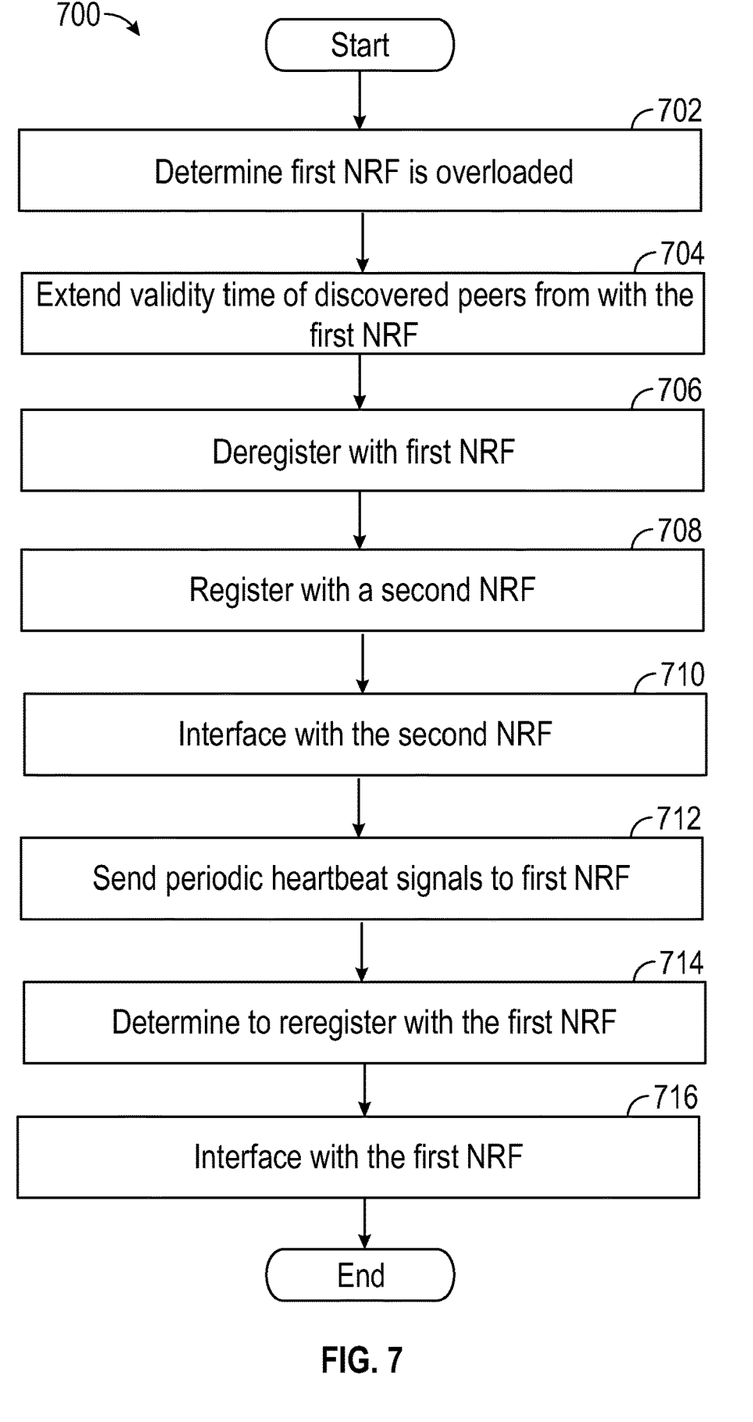
FIG. 7 is a flow chart of a method for a Network Function to perform overload protection for an overloaded Network Repository Function.

FIG. 7 is a flow chart of a method 700 for an NF to perform overload protection for an overloaded NRF. Beginning in operation 702, it may be determined that a first NRF is overloaded. For example, an NF may determine that the first NRF is overloaded from responses to a heartbeat signal and/or a discovery message which include a load metric indicating the NRF is overloaded and a validity time attribute. The NF may also determine that the first NRF is overloaded when no response from the first NRF is received in response to a heartbeat signal.

In operation 704, the validity time of discovered peers from the first NRF may be extended. For example, the NF may use the validity time attribute included in the response from the first NRF used to determine the first NRF is overloaded in operation 702. In another example when a validity time attribute is not received, the NF may extend the validity time by a predetermined value.

In operation 706, the NF may deregister with the first NRF. Then, the NF may register with a second NRF in operation 708. In operation 710, the NF may interface with the second NF.

The NF may send periodic heartbeat signals to the first NRF in operation 712. The NF may send the periodic heartbeat signals to determine if the first NRF responds to the heartbeat signals and to evaluate the current load metric of the first NRF when the NRF does respond to the heartbeat signals.

In operation 714, the NF may determine to reregister with the first NRF. The NF may determine to reregister with the first NRF based on load metrics received. The NF, or specifically the NRF recovery 308 shown in FIG. 3, may determine a delay or an appropriate time to reregister using a backoff algorithm and the load metrics received. In operation 716, the NF may begin interfacing with the first NRF.

Figure 8:
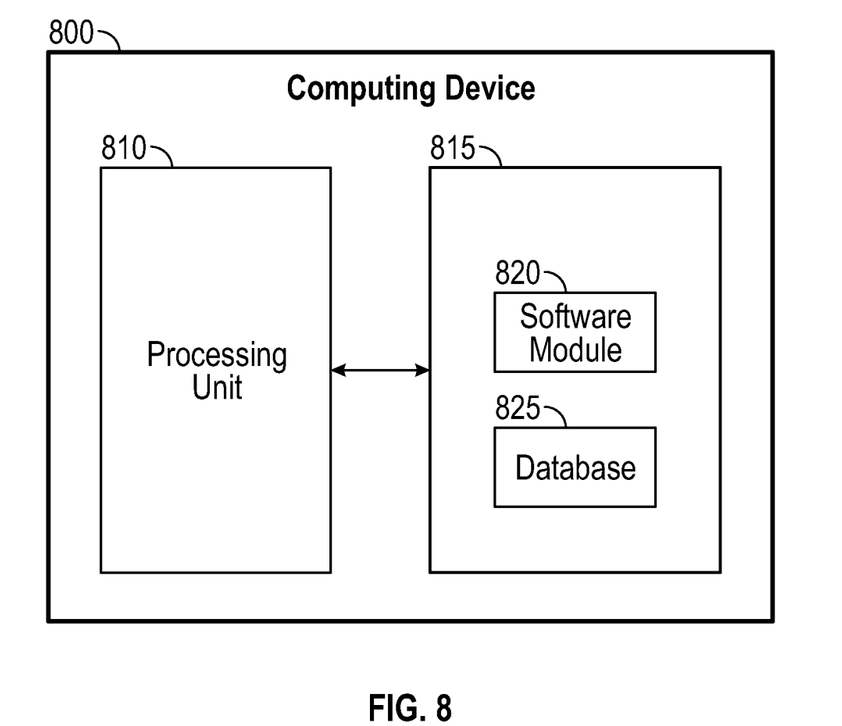
FIG. 8 is a block diagram of a computing device.

FIG. 8 is a block diagram of a computing device 800. As shown in FIG. 8, computing device 800 may include a processing unit 810 and a memory unit 815. Memory unit 815 may include a software module 820 and a database 825. While executing on processing unit 810, software module 820 may perform, for example, processes for load balancing and for providing NRF overload protection with respect to FIG. 2, FIG. 3A, FIG. 3B, FIG. 4, FIG. 5A, FIG. 5B, FIG. 6, and FIG. 7. Computing device 800, for example, may provide an operating environment for NRFs 202, NFs 204, NF 300, NF 402, NF 502, NRF 404, NRF 406, NRF 408, NRF 504, NRF 506, NRF 508, and the like. NRFs 202, NFs 204, NF 300, NF 402, NF 502, NRF 404, NRF 406, NRF 408, NRF 504, NRF 506, NRF 508, and the like may operate in other environments and are not limited to computing device 800.

Computing device 800 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 800 may comprise any computer operating environment, such as hand-held devices, multiprocessor systems, microprocessor-based or programmable sender electronic devices, minicomputers, mainframe computers, and the like. Computing device 800 may also be practiced in distributed computing environments where tasks are performed by remote processing devices. The aforementioned systems and devices are examples, and computing device 800 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 800 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
receiving, from a first Network Repository Function (NRF) of two or more NRFs, a load metric;
comparing the load metric to a threshold;
when the load metric is above the threshold, deregistering from the first NRF;
receiving an updated load metric from the first NRF;
comparing the updated load metric to the threshold; and
when the updated load metric is below the threshold, reregistering with the first NRF.

2. The method of claim 1, further comprising:
when the load metric is above the threshold, sending the a Network Function (NF) Discovery (NFD) message to a second NRF and to a third NRF in addition to the second NRF instead of the first NRF.

3. The method of claim 2, further comprising:
registering with one of the second NRF and the third NRF based on the load metric and a priority associated with each of the second NRF and the third NRF.

4. The method of claim 1, further comprising, when the load metric is above the threshold:
sending a Network Function (NF) Discovery (NFD) message to a second NRF instead of the first NRF.

5. The method of claim 1, further comprising, when the load metric is above the threshold:
registering with a second NRF; and
interfacing with the second NRF.

6. The method of claim 1, further comprising:
receiving, from the first NRF, a validity time attribute; and
extending a validity time of a peer discovered from the first NRF using the validity time attribute.

7. The method of claim 1, further comprising:
receiving, from a second NRF, a second load metric;
generating a weighted distribution using the second load metric and the load metric; and
determining an assignment of discovery messages across the first NRF and the second NRF based on the weighted distribution.

8. A system comprising:
a memory storage; and
a processing unit coupled to the memory storage, wherein the processing unit is operative to:
receive, from a first Network Repository Function (NRF) of two or more NRFs, a load metric;
compare the load metric to a threshold;
when the load metric is above the threshold, deregistering from the first NRF;
receive an updated load metric from the first NRF;
compare the updated load metric to the threshold; and
when the updated load metric is below the threshold, reregister with the first NRF.

9. The system of claim 8, wherein the processing unit is further operative to:
when the load metric is above the threshold, send a Network Function (NF) Discovery (NFD) message to a second NRF and to a third NRF in addition to the second NRF instead of the first NRF.

10. The system of claim 9, wherein the processing unit is further operative to:
register with one of the second NRF and the third NRF based on the load metric and a priority associated with each of the second NRF and the third NRF.

11. The system of claim 8, further comprising, when the load metric is above the threshold to:
sending a Network Function (NF) Discovery (NFD) message to a second NRF instead of the first NRF.

12. The system of claim 9, further comprising, when the load metric is above the threshold to:
register with the second NRF; and
interface with the second NRF.

13. The system of claim 8, further comprising to:
receive, from the first NRF, a validity time attribute; and
extend a validity time of a peer discovered from the first NRF using the validity time attribute.

14. The system of claim 8, further comprising to:
receive, from a second NRF, a second load metric;
generate a weighted distribution using the second load metric and the load metric; and
determine an assignment of discovery messages across the first NRF and the second NRF based on the weighted distribution.

15. A non-transitory computer-readable medium that stores a set of instructions which when executed perform a method executed by the set of instructions comprising:
receiving, from a first Network Repository Function (NRF) of two or more NRFs, a load metric;
comparing the load metric to a threshold;
when the load metric is above the threshold, deregistering from the first NRF;
receiving an updated load metric from the first NRF;
comparing the updated load metric to the threshold; and
when the updated load metric is below the threshold, reregistering with the first NRF.

16. The non-transitory computer-readable medium of claim 15, further comprising when the load metric is above the threshold, sending the NFD message to a second NRF and to a third NRF in addition to the second NRF instead of the first NRF.

17. The non-transitory computer-readable medium of claim 15, further comprising registering with one of the second NRF and the third NRF based on the load metric and a priority associated with each of the second NRF and the third NRF.

18. The non-transitory computer-readable medium of claim 15, further comprising, when the load metric is above the threshold:
sending a Network Function (NF) Discovery (NFD) message to a second NRF instead of the first NRF;
registering with the second NRF; and
interfacing with the second NRF.

19. The non-transitory computer-readable medium of claim 15, further comprising:
receiving, from the first NRF, a validity time attribute; and
extending a validity time of a peer discovered from the first NRF using the validity time attribute.

20. The non-transitory computer-readable medium of claim 18, further comprising:
receiving, from the second NRF, a second load metric;
generating a weighted distribution using the second load metric and the load metric; and
determining an assignment of discovery messages across the first NRF and the second NRF based on the weighted distribution.

\* \* \* \* \*